United States Patent Office 3,200,123
Patented Aug. 10, 1965

3,200,123
IMIDAZOQUINOLINES
Alfred Richardson, Jr., Reading, Ohio, Edward Delbert Amstutz, Bethlehem, Pa., and Geraldine Lynch Krueger, Cincinnati, Ohio, assignors to Richardson-Merrell Inc., New York, N.Y., a corporation of Delaware
No Drawing. Filed Jan. 26, 1962, Ser. No. 169,109
5 Claims. (Cl. 260—288)

This is a continuation-in-part of patent application Serial No. 824,776, filed July 3, 1959, now abandoned.

This invention relates to new chemical compounds which possess useful physiological and other valuable properties. New compounds within the scope of the present invention include 5,6-dihydroimidazo[ij]quinoline derivatives of the formula:

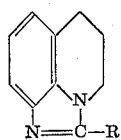

I where R may be a halogen, mercapto, mercaptoalkyl, hydroxy, trihalomethyl, amino, carboxy, dialkylaminoalkylamino, alkoxy, aryl, heterocyclic or heterocyclic-substituted alkyl radical of various kinds.

The novel compounds of the first formula where R is heterocyclic-substituted alkyl or mercaptoalkyl may be obtained by condensing 8-amino-1,2,3,4-tetrahydroquinoline with a suitable substituted carboxylic acid in the presence of a mineral acid according to the equation:

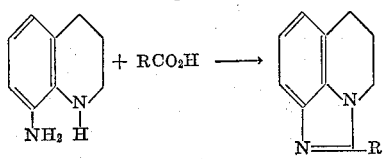

In cases where R is aryl or heterocyclic, the carboxylic acid chloride was used instead of the carboxylic acid and the intermediate of formula:

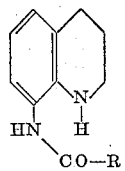

was first isolated. This intermediate was then cyclized by heating with a dehydrating agent such as phosphorous pentoxide to give the desired compound.

The compound where R is hydroxy may be obtained from the reaction of phosgene with 8-amino-1,2,3,4-tetrahydroquinoline. The hydroxyl derivative in turn may be converted to a halogen derivative by treatment, for example, with a phosphorous oxyhalide. The halogen derivative when treated with an alkali metal alkoxide is converted to the alkoxy derivative. The compound where R is mercapto may be obtained from the reaction of carbon disulfide with 8-amino-1,2,3,4-tetrahydroquinoline.

The preparation of the new compounds of the invention is further described in the examples.

The useful physiological properties of the compounds of Formula I make them suitable for use as anti-inflammatory agents. As such they are useful in the reduction of inflammation and edema and thus find application in the treatment of rheumatoid arthritis, gouty arthritis, neuralgia, bursitis, dermatosis and conjunctivitis. Some compounds are uterotrophic and are useful in functional uterine disorders. Some compounds have hypnotic and analgesic properties.

Most of the compounds are basic and may be used in the form of the free bases or acid addition salts. Such salts may be the hydrochloride, hydrobromide, citrate, succinate, maleate, acetate and other pharmaceutically acceptable salts. The compounds may be administered orally in tablets or capsules in dosage ranges of 25 mg. to 2.5 g. daily and parenterally in dosage ranges of 2 mg. to 1 g. daily. The preferred route of administration is oral.

EXAMPLE I 2-(p-aminothiophenoxymethyl)-5,6-dihydroimidazo[ij]quinoline

A solution of 1.5 g. (0.01 mole) of 8-amino-1,2,3,4-tetrahydroquinoline and 1.8 g. (0.01 mole) of p-aminothiophenoxyacetic acid (Evans) in 25 ml. of 4 N hydrochloric acid was refluxed for sixty-nine hours. The solution was cooled and made alkaline with 6 N ammonium hydroxide, whereupon a gum separated from the reaction mixture. The crude product was crystallized from methanol-water (decolorizing charcoal was employed) until a maximum melting point was obtained. The colorless needles weighed 1.6 g. and melted at 92–94° C. A picrate formed as yellow prisms which melted at 169° C.

By the method given in Example I, the following compounds were also synthesized using the appropriate carboxylic acid in place of p-aminothiophenoxyacetic acid.

| Compound | R | Reflux Time (Hrs.) | M.P. (° C.) | Picrate M.P. (° C.) |
|---|---|---|---|---|
| A | HS—CH$_2$— | 24 | 160–161 | 215–216 |
| B | HS—CH$_2$CH$_2$— | 24 | oil | 190 |
| C |  | 24 | 142.5 | 183–185 |
| D | 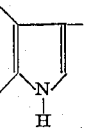—CH$_2$— | 69 | 232–233 | 211–213 |

Compound I(B) also has the property of reducing cholesterol levels in the serum.

EXAMPLE II 2-hydroxy-5,6-dihydroimidazo[ij]quinoline

A solution of 2.9 g. (0.02 mole) of 8-amino-1,2,3,4-tetrahydroquinoline in 20 ml. of glacial acetic acid was treated with a solution of 2.2 g. (0.022 mole) of phosgene in 50 ml. of chlorobenzene. The reaction solution became warm and orange in color. It was heated on a steam bath for one hour, during which time a gas evolved which was assumed to be hydrogen chloride. The liquid phase was evaporated in vacuo, and the residue which remained was washed with dilute ammonium hydroxide. The light brown crystals were filtered, washed with water and recrystallized from methanol-water twice to form 2.6 g. of colorless prisms which melted at 213–214° C. This compound also exhibits hypnotic activity.

EXAMPLE III 2-mercapto-5,6-dihydroimidazo[ij]quinoline

A solution of 1.5 g. (0.01 mole) of 8-amino-1,2,3,4-tetrahydroquinoline in 15 ml. of 95 percent ethanol was treated with a solution of 0.76 g. (0.01 mole) of carbon disulfide in 95 percent ethanol. The solution was allowed to stand for one hour, during which time the odor of hydrogen sulfide became apparent, but the solution remained clear. The solution was refluxed until hydrogen sulfide ceased to evolve (twenty-four hours) and was then cooled. The solid which crystallized was filtered, washed with water and recrystallized twice from 95 percent ethanol to yield 0.6 g. of very pale yellow crystals which melted at 214.5–215.5° C.

EXAMPLE IV

*2-chloro-5,6-dihydroimidazo[ij]quinoline*

A solution of 17.4 g. (0.10 mole) of 2-hydroxy-5,6-dihydroimidazo[ij]quinoline in 50 ml. of phosphorous oxychloride was refluxed for one and one-half hours. The solution was cooled and poured onto ice. The acidic solution was cooled and made slightly alkaline with 6 N ammonium hydroxide. The solid which separated was filtered, washed with water and recrystallized from methanol-water. The colorless needles weighed 11.6 g. and melted at 75–76° C. The product formed a picrate which melted at 175° C. (dec.).

EXAMPLE V

*2-methoxy-5,6-dihydroimidazo[ij]quinoline*

A mixture of 1.0 g. (0.0052 mole) of 2-chloro-5,6-dihydroimidazo[ij]quinoline in 25 ml. of absolute methanol which was 2 M in sodium methoxide was refluxed for five and one-half hours. The sodium chloride which separated was removed by filtration and the filtrate was poured into water. The oil which separated was extracted with ether, and the ethereal solution was dried over magnesium sulfate. Evaporation of the solvent afforded a quantitative yield of 2-methoxy-5,6-dihydroimidazo[ij]quinoline as an oil. The product formed a picrate which melted at 154–155° C. The product also formed a hydrochloride which melted at 212–214° C.

EXAMPLE VI

*2-(γ-pyridyl)-5,6-dihydroimidazo[ij]quinoline*

A solution of 1.5 g. (0.01 mole) of 8-amino-1,2,3,4-tetrahydroquinoline and 1.4 g. (0.01 mole) of isonicotinyl chloride in 20 ml. of benzene and 10 ml. of pyridine was refluxed for twenty-four hours. The orange solution was cooled and diluted with an equal volume of cold water, whereupon fine needles separated. The solid was filtered, washed with water and recrystallized from methanol-water to give 1.8 g. of product, which melted at 142.5–143.5° C. (See table in Example I.)

Also synthesized by this method were the following compounds:

| Compound | R | M.P. (° C.) | Picrate M.P. (° C.) |
|---|---|---|---|
| A | CH$_3$O—, CH$_3$O—⟨⟩—, CH$_3$O— | 181–182 | 208–210 |
| B | ⟨⟩⟨⟩— | 206–207 | 221–222 |

EXAMPLE VII

*2-(-p-nitrophenyl)-5,6-dihydroimidazo[ij]quinoline*

A mixture of 1.0 g. (0.0034 mole) of 8-(p-nitrobenzamido)-1,2,3,4-tetrahydroquinoline and 4.8 g. (0.034 mole) of phosphorous pentoxide in 25 ml. of benzene was refluxed for two hours. The mixture was cooled and the benzene layer removed by decantation. The phosphorous pentoxide layer was slurried with an ice and water mixture, and the resulting acidic mixture was made alkaline with 6 N ammonium hydroxide. The residue was filtered, washed with water and recrystallized from methanol and water to give the desired product as yellow needles which melted at 179–180° C. The product formed a picrate which melted at 214–215° C.

Also synthesized by this method were the following compounds:

| Compound | R | M.P. (° C.) | Picrate M.P. (° C.) |
|---|---|---|---|
| A | C$_6$H$_5$— | 80–82 | 196–197 |
| B | CH$_3$O—, CH$_3$O—⟨⟩—, CH$_3$O— | 179–180 | 208–210 |

EXAMPLE VIII

*2-trifluoromethyl-5,6-dihydromidazo[ij]quinoline*

A solution of 8.9 g. (0.06 mole) of 8-amino-1,2,3,4-tetrahydroquinoline and 6.8 g. (0.06 mole) of trifluoroacetic acid in 75 ml. of 4 N hydrochloric acid was refluxed for 48 hours. The cooled reaction mixture was diluted with three volumes of water and chilled. The solid which separated was filtered and washed with water and with dilute ammonium hydroxide solution. An additional small quantity of product was obtained by neutralizing the acidic filtrate with ammonium hydroxide. The solids were combined and recrystallized from aqueous ethanol to give 11.2 g. (83% yield) of 2-trifluoromethyl-5,6-dihydroimidazo[ij]quinoline, obtained as colorless needles melting at 103–104° C.

EXAMPLE IX

*2-amino-5,6-dihydroimidazo[ij]quinoline*

A slurry of 14.0 g. (0.094 mole) of 8-amino-1,2,3,4-tetrahydroquinoline in 150 ml. of water was stirred, and the system was purged with nitrogen while 10 g. (0.094 mole) of cyanogen bromide was added in small portions. The reaction mixture became warm and another solid precipitated from solution. The mixture was stirred for four hours after the cyanogen bromide was all added. After standing overnight, the solid was collected by filtration, then slurried in dilute aqueous sodium hydroxide solution. The resulting solid was again collected, washed with water, dried, and recrystallized from toluene to give colorless needles of 2-amino-5,6-dihydroimidazo[ij]quinoline, melting at 201–202° C. The product weighed 6.5 g., representing a yield of 40%.

EXAMPLE XI

*2-(1,3-diketo-2-indanyl)-5,6-dihydroimidazo[ij]quinoline*

A finely-ground mixture of 14.5 g. (0.084 mole) of 2-methyl-5,6-dihydroimidazo[ij]quinoline and 12.5 g. (0.084 mole) of phthalic anhydride was heated in a nitrogen atmosphere over a free flame, for about 20 minutes until all effervescence had ceased and the mass resolidified. The crude product was recrystallized from glacial acetic acid. The collected bright yellow crystals were washed with dilute ammonium hydroxide and with water and dried, weighing 8.0 g., and melting at 314–315° C.

EXAMPLE XII

*2-(β-diethylaminoethylamino)-5,6-dihydroimidazo[ij]quinoline*

A solution of 1.9 g. (0.01 mole) of 2-chloro-5,6-dihydroimidazo[ij]quinoline (Example IV) in 25 ml. of β-diethylaminoethylamine was heated to refluxing for 19 hours. The cooled reaction mixture was poured into three volumes of water and this resulting mixture was extracted with ether. The dried ether solution was evaporated under reduced pressure. The remaining oily residue gradually solidified and was then recrystallized from petroleum ether (B.P. 75–90° C.) to give 0.5 g. of a tan powder, melting at 126–127° C. A picrate prepared from this product melted at 207–210° C.

We claim:
1. 2-methoxy-5,6-dihydroimidazo[ij]quinoline.
2. 2-trifluoromethyl-5,6-dihydroimidazo[ij]quinoline.
3. 2-amino-5,6-dihydroimidazo[ij]quinoline.
4. 2 - (1,3 - diketo-2-indanyl)-5,6-dihydroimidazo[ij]quinoline.
5. 2 - (β-diethylaminoethylamino)-5,6-dihydroimidazo[ij]quinoline.

References Cited by the Examiner

Richardson, thesis: The Synthesis and Chemistry of 2-Substituted-5,6-Dihydro-Imidazo[l,j]Quinolines and Certain Related Compounds. Received by Lehigh University Library, May 27, 1958.

NICHOLAS S. RIZZO, *Primary Examiner.*

DUVAL T. McCUTCHEN, IRVING MARCUS, WALTER A. MODANCE, *Examiners.*